US008588589B2

(12) United States Patent
Adimatyam et al.

(10) Patent No.: US 8,588,589 B2
(45) Date of Patent: Nov. 19, 2013

(54) SYSTEMS AND METHODS FOR AUTOMATICALLY CONVERTING MEDIA CONTENT STREAM DATA ACCUMULATED DURING A PAUSE OF PLAYBACK FROM A BUFFER TO A PERMANENT RECORDING

(75) Inventors: Venkata S. Adimatyam, Irving, TX (US); Sameer Gavade, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 289 days.

(21) Appl. No.: 12/819,382

(22) Filed: Jun. 21, 2010

(65) Prior Publication Data

US 2011/0311204 A1   Dec. 22, 2011

(51) Int. Cl.
*H04N 5/76*   (2006.01)
*H04N 21/41*   (2011.01)

(52) U.S. Cl.
USPC ................. 386/295; 386/230; 348/E5.007

(58) Field of Classification Search
None
See application file for complete search history.

(56) References Cited

U.S. PATENT DOCUMENTS

| | | | |
|---|---|---|---|
| 7,257,308 B2 * | 8/2007 | Plourde et al. ............. | 386/230 |
| 7,263,280 B2 * | 8/2007 | Bullock et al. ............. | 386/241 |
| 7,409,140 B2 * | 8/2008 | Rodriguez et al. .......... | 386/248 |
| 7,512,315 B2 * | 3/2009 | Kaminski et al. ........... | 386/344 |
| 7,949,776 B2 * | 5/2011 | Swan ........................... | 709/231 |
| 7,962,011 B2 * | 6/2011 | Plourde et al. ............. | 386/295 |
| 7,996,875 B2 * | 8/2011 | Guo et al. ................... | 725/94 |
| 2001/0033736 A1 * | 10/2001 | Yap et al. .................. | 386/46 |
| 2003/0097659 A1 | 5/2003 | Goldman | |
| 2007/0073728 A1 * | 3/2007 | Klein et al. ................ | 707/10 |
| 2007/0180387 A1 * | 8/2007 | Gravina et al. ............ | 715/746 |
| 2007/0248311 A1 * | 10/2007 | Wice et al. ................. | 386/52 |
| 2008/0168523 A1 * | 7/2008 | Ansari et al. .............. | 725/131 |
| 2009/0202216 A1 * | 8/2009 | Kaminski et al. .......... | 386/46 |

* cited by examiner

*Primary Examiner* — Jay Patel
*Assistant Examiner* — Reza Aghevli

(57) ABSTRACT

Exemplary systems and methods for automatically converting media content stream data from a buffer to a permanent recording are disclosed. An exemplary method includes a media content access subsystem receiving data representative of a media content stream, temporarily storing the data representative of the media content stream within a buffer for playback to a user, detecting an input command provided by the user to pause the playback of the media content stream, pausing the playback of the media content stream, accumulating data representative of a portion of the media content stream not yet played back within the buffer, detecting an alert condition indicating that the data representative of the portion of the media content stream not yet played back is about to be lost from the buffer, and converting the data representative of the portion of the media content stream not yet played back to a permanent recording.

20 Claims, 12 Drawing Sheets

SYSTEMS AND METHODS FOR AUTOMATICALLY CONVERTING MEDIA CONTENT STREAM DATA ACCUMULATED DURING A PAUSE OF PLAYBACK FROM A BUFFER TO A PERMANENT RECORDING

BACKGROUND INFORMATION

Set-top box devices and other media content access devices are often configured to provide users with access to a large number and variety of media content choices. For example, a user may choose to experience a variety of broadcast television programs, pay-per-view services, video-on-demand programming, Internet services, and audio programming via a set-top box device.

Certain media content access devices include a digital video recording ("DVR") application. In general, media content access devices with DVR applications temporarily buffer an incoming media content stream for playback. For example, a set-top box device may temporarily buffer an incoming television program. The temporary buffering may support several functions, including a capability to pause and subsequently resume playback of the television program in a time-shifted manner. However, a buffer used for the temporary buffering of an incoming television program typically has a limited buffer capacity in which to temporarily store incoming television program data. As a result, if a user pauses the playback of an incoming television program for an extended period of time, the buffer may reach its capacity and data stored within the buffer may be lost before the user is able to resume playback and experience the remainder of the television program.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers may designate identical or similar elements.

DETAILED DESCRIPTION OF PREFERRED EMBODIMENTS

Exemplary systems and methods for automatically converting media content stream data from a buffer to a permanent recording are described herein. As described in more detail below, one or more of the exemplary systems and/or methods disclosed herein may enable a media content access subsystem (e.g., a set-top box device) to automatically convert media content stream data stored within a buffer to a permanent recording. In some examples, the media content stream data may be automatically converted to a permanent recording after a user has paused a playback of a media content stream and in response a detection of an alert condition indicating that a portion of the media content stream data not yet played back is about to be lost from the buffer (e.g., is about to be overwritten). By converting buffered data to a permanent recording, the portion of the media content stream data not yet played back may be preserved for the user to experience at her convenience at a later time.

As used herein, "media content" may refer generally to any content accessible via an access subsystem. The term "media content stream" may refer to a stream of data representative of media content configured to be received by a media content access subsystem from a media content provider. In some examples, a media content stream may include data representative of one or more media content instances. The term "media content instance" will be used herein to refer to any television program, on-demand media program (e.g., video-on-demand program), pay-per-view event, broadcast media program (e.g., broadcast television program), multicast media program, narrowcast media program, advertisement, IPTV media content, video, movie, song, video game content, or combination of these or other forms of media content that may be viewed or otherwise experienced by a user.

Figure 1:
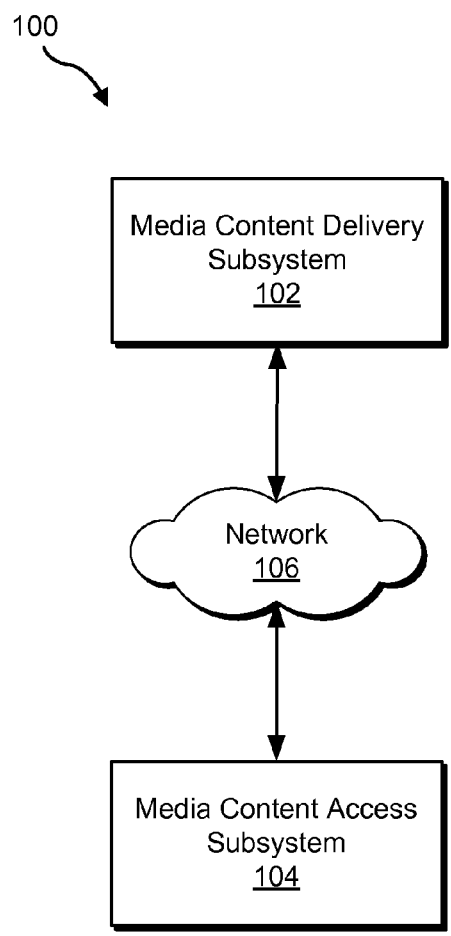
FIG. 1 illustrates an exemplary media content delivery system according to principles described herein.

FIG. 1 illustrates an exemplary media content delivery system 100 (or simply "system 100"). System 100 may include a media content delivery subsystem 102 (or simply "delivery subsystem 102") and a media content access subsystem 104 (or simply "access subsystem 104") in communication with one another via a network 106. Access subsystem 104 may be configured to communicate with and receive a media content stream from delivery subsystem 102.

Delivery subsystem 102 and access subsystem 104 may communicate using any suitable communication technologies, devices, networks, media, and protocols supportive of remote data communications. For example, delivery subsystem 102 and access subsystem 104 may communicate over network 106 using any communication platforms and technologies suitable for transporting media content and/or communication signals, including known communication technologies, devices, transmission media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, live transmission technologies (e.g., media streaming technologies), media file transfer technologies, in-band and out-of-band signaling technologies, and other suitable communications technologies.

Network 106 may include one or more networks or types of networks (and communication links thereto) capable of carrying communications, media content, and/or data signals between delivery subsystem 102 and access subsystem 104. For example, network 106 may include, but is not limited to, one or more wireless networks (e.g., satellite media broadcasting networks or terrestrial broadcasting networks), mobile telephone networks (e.g., cellular telephone networks), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, local area networks, public networks, private networks, packet-switched networks, and any other networks capable of carrying data and/or communications signals between delivery subsystem 102 and access subsystem 104. Communications between delivery subsystem 102 and access subsystem 104 may be transported using any one of above-listed networks, or any combination or sub-combination of the above-listed networks.

While an exemplary system 100 is shown in FIG. 1, the exemplary components illustrated in FIG. 1 are not intended to be limiting. Other hardware environments and implementations may be used in other implementations. Exemplary components of system 100 will now be described in additional detail.

Figure 2:
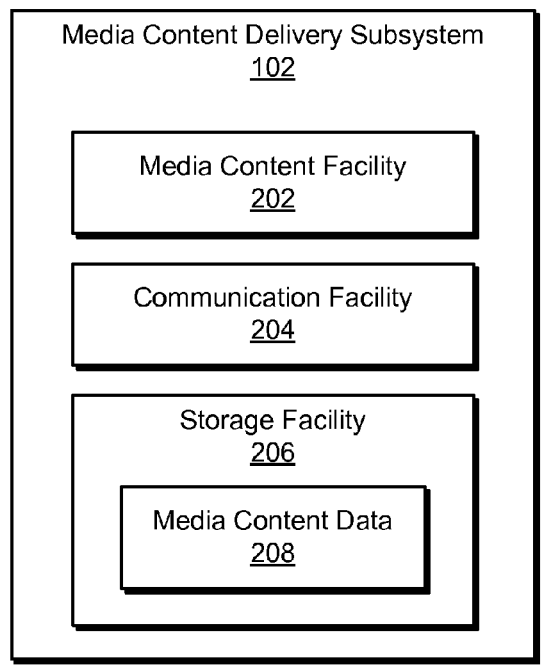
FIG. 2 illustrates exemplary components of a media content delivery subsystem according to principles described herein.

FIG. 2 illustrates exemplary components of delivery subsystem 102. As shown in FIG. 2, delivery subsystem 102 may include a media content facility 202, a communication facility 204, and a storage facility 206, which may be in communication with one another using any suitable communication technologies. It will be recognized that although facilities 202-206 are shown to be separate facilities in FIG. 2, any of those facilities may be combined into a single facility as may serve a particular implementation.

Media content facility 202 may be configured to generate one or more media content streams comprising data representative of one or more media content instances. Media content facility 202 may be configured to generate the media content streams in any suitable manner as may serve a particular implementation.

Communication facility 204 may be configured to facilitate communication between delivery subsystem 102 and access subsystem 104. In particular, communication facility 204 may be configured to transmit and/or receive communication signals, media content streams, metadata and/or any other data to/from access subsystem 104. For example, communication facility 204 may transmit (e.g., broadcast, multicast, and/or narrowcast) data representative of one or more media content instances to access subsystem 104. Such data may be transmitted in one or more media content streams or in any other suitable manner as may serve a particular implementation. Communication facility 204 may be configured to interface with any suitable communication media, protocols, and formats, including any of those mentioned above.

Storage facility 206 may be configured to maintain media content data 208 representative of one or more media content streams and/or media content instances. It will be recognized that storage facility 206 may maintain additional or alternative data as may serve a particular implementation.

Figure 3:
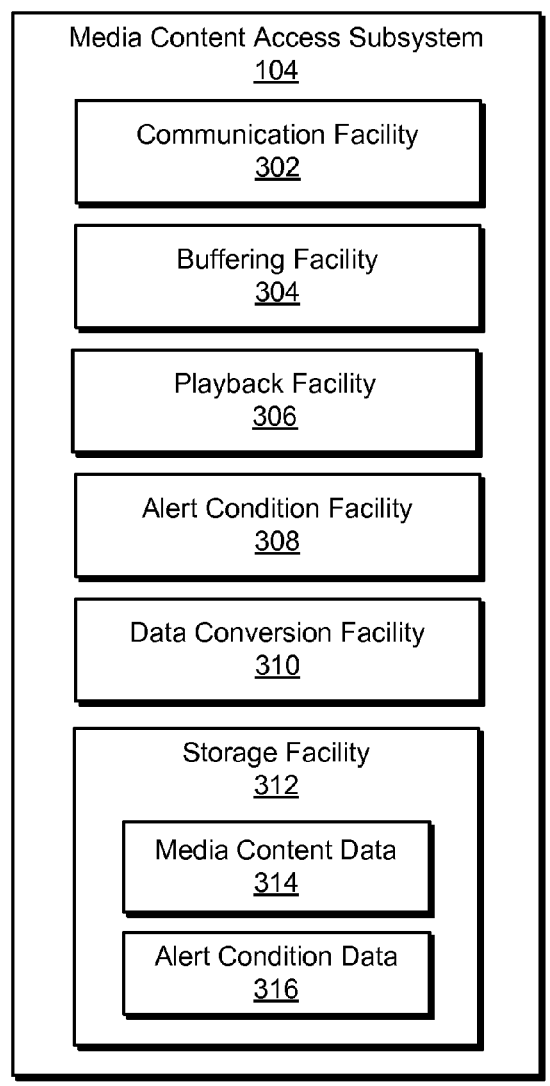
FIG. 3 illustrates exemplary components of a media content access subsystem according to principles described herein.

FIG. 3 illustrates exemplary components of access subsystem 104. As shown in FIG. 3, access subsystem 104 may include a communication facility 302, a buffering facility 304, a playback facility 306, an alert condition facility 308, a data conversion facility 310, and a storage facility 312, which may be in communication with one another using any suitable communication technologies. It will be recognized that although facilities 302-312 are shown to be separate facilities in FIG. 3, any of those facilities may be combined into a single facility as may serve a particular implementation.

Communication facility 302 may be configured to facilitate communication between access subsystem 104 and delivery subsystem 102. In particular, communication facility 302 may be configured to transmit and/or receive communication signals, media content streams, media content instances, metadata and/or any other data to/from delivery subsystem 102. For example, communication facility 302 may receive data representative of a media content stream comprising one or more media content instances from delivery subsystem 102. Communication facility 302 may be configured to interface with any suitable communication media, protocols, and formats, including any of those mentioned above.

Buffering facility 304 may be configured to facilitate temporary storage of media content stream data within a buffer. For example, buffering facility 304 may be configured to temporarily store data representative of a media content stream received from delivery subsystem 102 in a buffer for playback to a user. The media content stream may be received in any suitable manner (e.g., from a broadcast, multicast, and/or narrowcast media content stream) and may include data representative of one or more media content instances (e.g., one or more television programs).

In some examples, buffering facility 304 may be configured to accumulate data representative of a portion of the media content stream not yet played back within the buffer. For example, if playback of the media content stream is paused (e.g., in response to an input command provided by a user), buffering facility 304 may be configured to accumulate the portion of the media content stream not yet played back in the buffer while the playback of the media content stream is paused, as will be explained in more detail below. It will be recognized that the portion of the media content stream that has been played back may additionally be stored within the buffer.

Playback facility 306 may be configured to control a presentation of the received media content stream to a user of access subsystem 104. The playback of the media content stream may be performed linearly (e.g., "normal" playback) and/or non-linearly (e.g., using a trick play mode). For example, playback facility 306 may be configured to receive and execute one or more commands input by a user that are configured to play back a media content instance, pause a presentation of a media content instance, resume a presentation of a media content instance, skip to a different position within a media content instance, fast forward within a media content instance, and/or rewind within a media content instance. In some examples, playback facility 306 may be configured to detect an input command provided by a user to pause the playback of a media content stream and pause the playback of the media content stream in response to the input command.

Alert condition facility 308 may be configured to detect an alert condition indicating that data representative of a portion of a media content stream not yet played back is about to be lost. For example, alert condition facility 308 may be configured to detect that the data representative of the portion of the media content stream not yet played back has reached the end of the buffer and/or is about to be overwritten, as will be explained in more detail below.

Data conversion facility 310 may be configured to convert data representative of a portion of a media content stream not yet played back to a permanent recording. For example, in response to a detection of an alert condition indicating that the data representative of the portion of the media content stream not yet played back is about to be lost, data conversion facility 310 may convert the data to a permanent recording to preserve the data for a user to experience at her convenience in the future. The data may be converted in any suitable manner as many serve a particular implementation. In some examples, the data may be transferred from a buffer to persistent storage.

Storage facility 312 may be configured to maintain media content data 314 representative of one or more media content streams including one or more media content instances and alert condition data 316 representative of one or more alert conditions configured to indicate when data representative of a portion of a media content stream not yet played back is about to be lost from a buffer. It will be recognized that storage facility 312 may maintain additional or alternative data as may serve a particular implementation.

Figure 4:
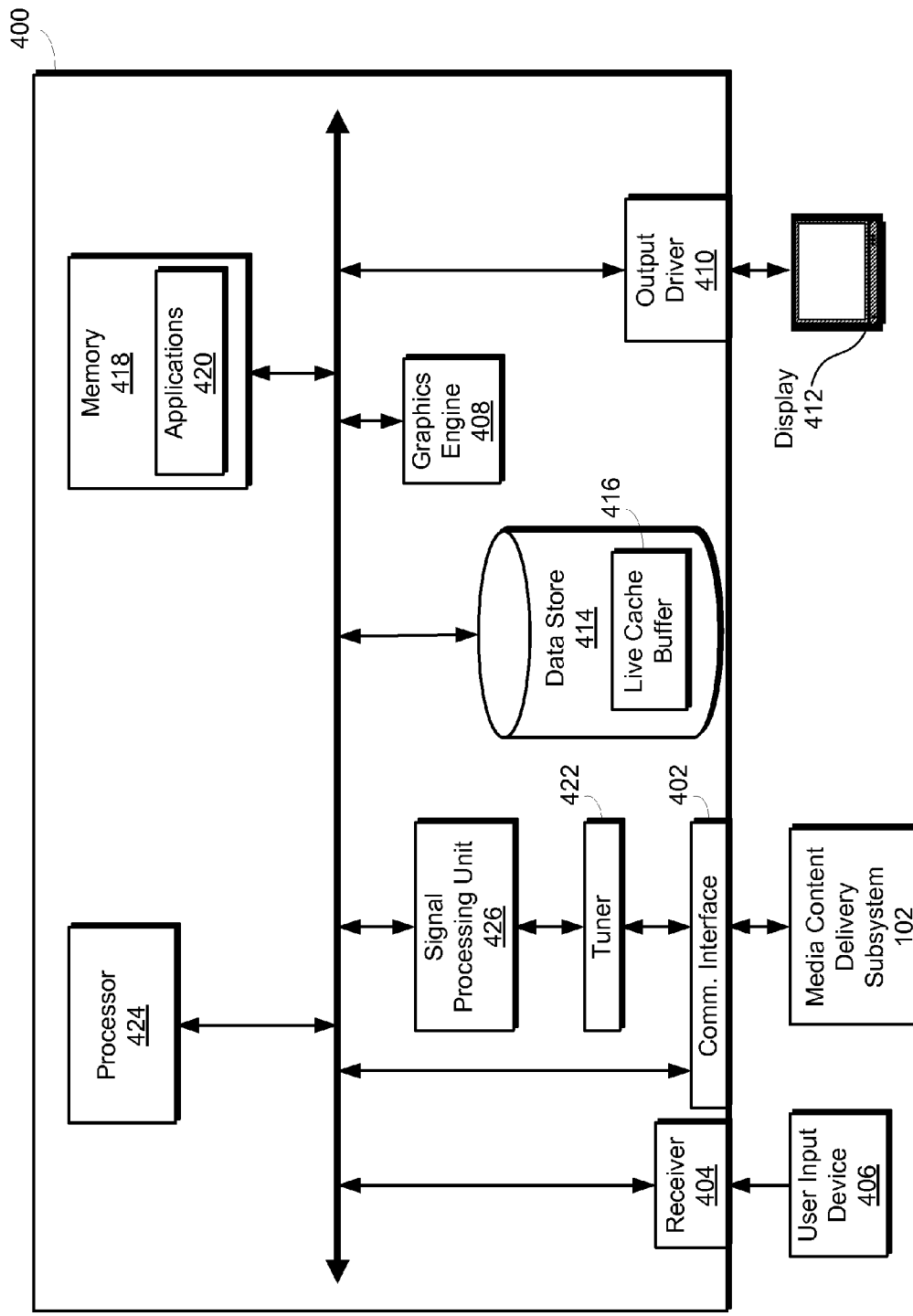
FIG. 4 illustrates an exemplary media content access device having the media content access subsystem of FIG. 3 implemented thereon according to principles described herein.

Access subsystem 104 and/or one or more components of access subsystem 104 may be implemented as may suit a particular application. FIG. 4 illustrates an exemplary media content access device 400 (or simply "device 400") having access subsystem 104 implemented thereon. Device 400 may include one or more of the components of access subsystem 104 shown in FIG. 3 and may be configured to perform one or more of the processes and/or operations described herein. Device 400 may include, but is not limited to, a set-top box device, a digital video recorder ("DVR") device, a multi-room DVR device, a media content processing device, a communications device, a mobile device (e.g., a mobile phone device), a handheld device, a personal computer, a phone device, a personal-digital assistant device, a gaming device, a television device, and/or any device configured to perform one or more of the processes and/or operations described herein.

As shown in FIG. 4, device 400 may include a communication interface 402 configured to receive media content and/or data (e.g., metadata, program guide data, and/or any other data associated with media content) in any acceptable format from delivery subsystem 102 or from any other suitable external source. Communication interface 402 may include any device, logic, and/or other technologies suitable for receiving signals and/or data representative of media content and/or other types of media content or data. Communication interface 402 may be configured to interface with any suitable communication media, protocols, and formats, including any of those mentioned above.

Device 400 may include a receiver 404 configured to receive user input signals from a user input device 406. User input device 406 may include, for example, a remote control device or any other suitable input device and may be configured to communicate with receiver 404 via a wireless link, electrical connection, or any other suitable communication link.

Device 400 may include a graphics engine 408 and an output driver 410. Graphics engine 408 may be configured to generate graphics to be provided to output driver 410, which may be configured to interface with or drive a display 412. Output driver 410 may provide output signals to display 412, the output signals including graphical media content (e.g., media content and/or program guide media content) generated by graphics engine 408 and to be presented by display 412 for experiencing by a user. For example, output driver 410 may provide data representative of a graphical user interface ("GUI") including a program guide view, a media playback view, or a permanent recording listing view to display 412 for presentation to the user. Graphics engine 408 and output driver 410 may include any combination of hardware, software, and/or firmware as may serve a particular implementation.

Data store 414 may include one or more data storage media, devices, or configurations and may employ any type, form, and combination of storage media. For example, data store 414 may include, but is not limited to, a hard drive, network drive, flash drive, magnetic disc, optical disc, or other non-volatile storage unit. Media content and/or data associated with media content may be temporarily and/or permanently stored in data store 414.

Data store 414 is shown to be included within device 400 in FIG. 4 for illustrative purposes only. It will be understood that data store 414 may additionally or alternatively be located external to device 400.

Data store 414 may include one or more live cache buffers 416 (or simply "buffers 416"). Live cache buffer 416 may additionally or alternatively reside in memory 418 or in a storage device external to device 400. In some examples, media content stream data may be temporarily stored in live cache buffer 416 to facilitate playback of media content, pausing of playback of media content, time-shifted playback of media content, recording of media content, and/or presentation of media content in one or more trick play modes.

Device 400 may include memory 418. Memory 418 may include, but is not limited to, FLASH memory, random access memory ("RAM"), dynamic RAM ("DRAM"), other suitable computer-readable media, or any combination or sub-combination thereof. In some examples, one or more applications 420 configured to run on or otherwise be executed by device 400 may reside in memory 418.

Device 400 may include one or more tuners 422. Tuner 422 may be configured to selectively receive media content carried on a particular media content carrier channel such that the media content may be processed by device 400. In some examples, media content received by tuner 422 may be temporarily buffered, or stored, in buffer 416. If there are multiple tuners 422, there may be a buffer 416 corresponding to each of the tuners 422.

While tuner 422 may be used to receive certain media content-carrying signals transmitted by provider subsystem 102, device 400 may be configured to receive other types of media content signals (including media content signals and/or program guide data signals) from provider subsystem 102 and/or one or more other sources without using a tuner. For example, provider subsystem 102 may transmit digital streams of data packets (e.g., Internet Protocol ("IP") based data packets) that can be received without using a tuner. For such types of media content signals, communication interface 402 may receive and forward the signals directly to other components of device 400 (e.g., buffer 416, processor 424, and/or signal processing unit 426) without the signals going through tuner 422. For an IP-based signal, for example, signal processing unit 426 may function as an IP receiver.

Device 400 may include at least one processor, such as processor 424, configured to control and/or perform one or more operations of device 400. Device 400 may also include a signal processing unit 426 configured to process incoming media content. Signal processing unit 426 may be configured, for example, to demodulate and parse encoded digital media content. In some examples, device 400 may include one or more signal processing units 426 corresponding to each of the tuners 422.

Figure 5:
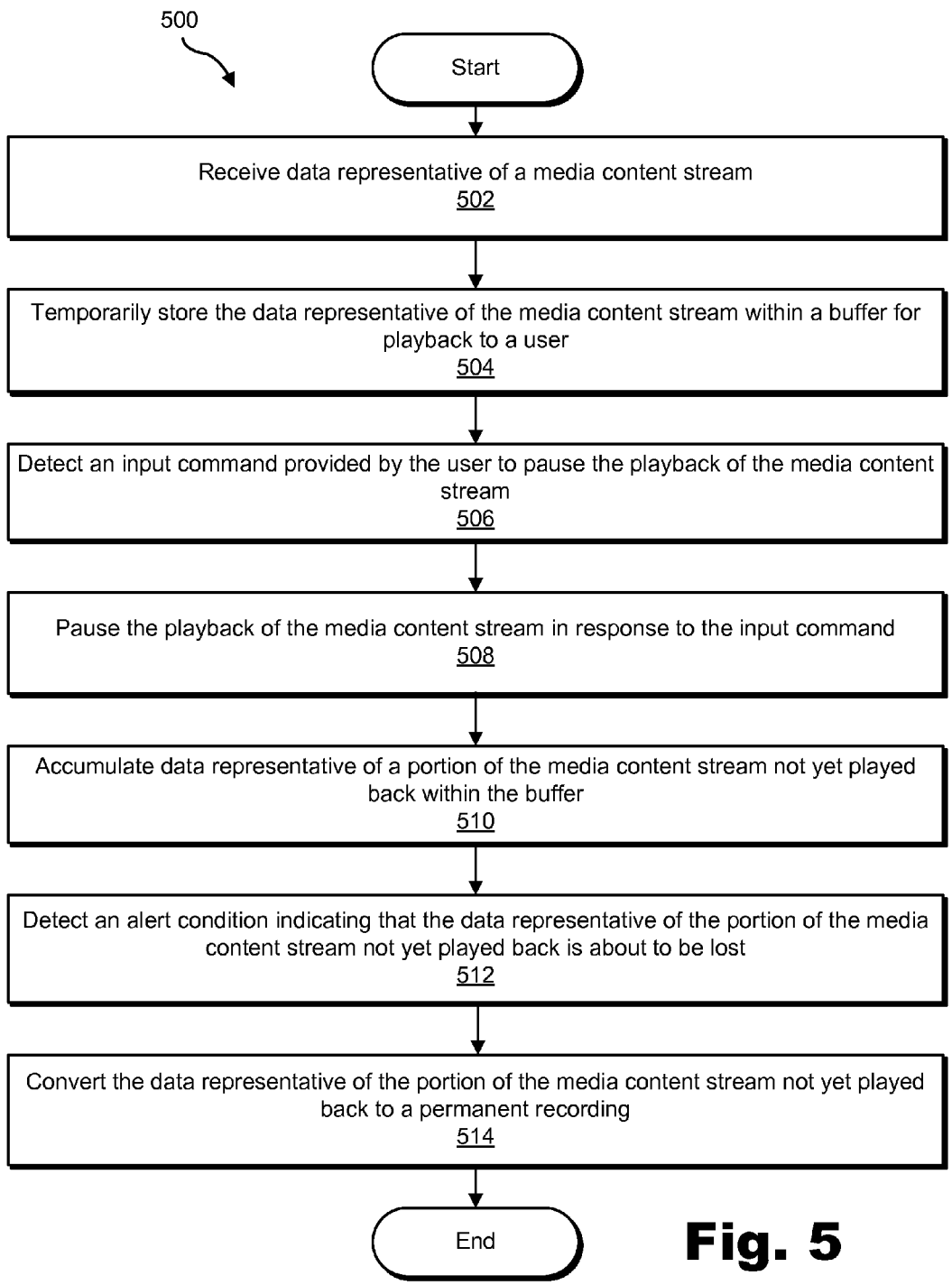
FIG. 5 illustrates an exemplary method of automatically converting media content stream data from a buffer to a permanent recording according to principles described herein.

FIG. 5 illustrates an exemplary method 500 of automatically converting media content stream data from a buffer to a permanent recording. While FIG. 5 illustrates exemplary steps according to one embodiment, other embodiments may omit, add to, reorder, and/or modify any of the steps shown in FIG. 5. The steps shown in FIG. 5 may be performed by any component or combination of components of access subsystem 104.

In step 502, data representative of a media content stream is received. The data representative of the media content stream may be received in any suitable manner as may serve a particular implementation, such as described herein. For example, communication facility 302 of access subsystem 104 may be configured to receive the data representative of the media content stream from delivery subsystem 102. The media content stream may include data representative of one or more media content instances (e.g., one or more television programs).

In step 504, the data representative of the media content stream is temporarily stored within a buffer for playback to a user. The data representative of the media content stream may be stored within any suitable buffer and in any suitable manner as may serve a particular implementation. For example, buffering facility 304 may be configured to temporarily store data representative of at least part of the media content stream (e.g., data representative of one or more media content instances included in the media content stream) within buffer 416 for subsequent playback to a user.

Figure 6:
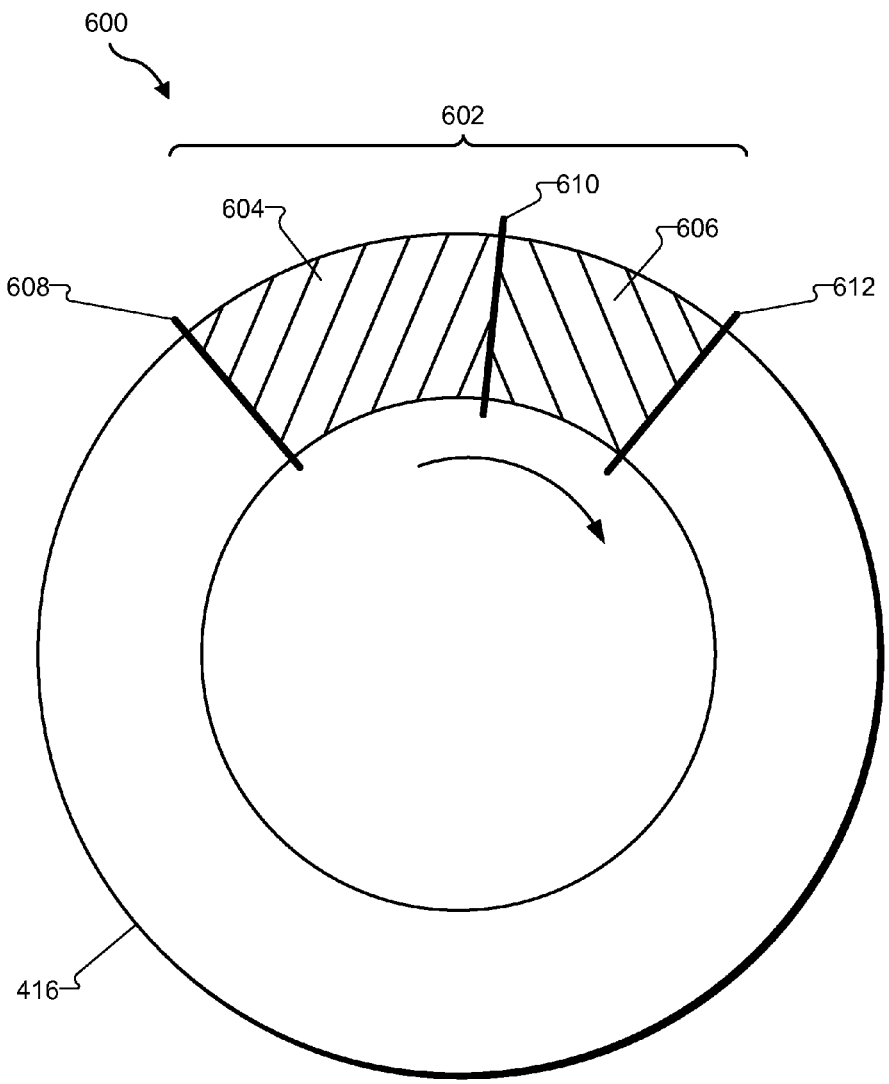
FIG. 6 illustrates an exemplary buffer with media content stream data temporarily stored therein according to principles described herein.

For example, FIG. 6 represents an exemplary implementation 600 of buffer 416. Implementation 600 illustrates buffer 416 as a circular buffer for illustrative purposes only and is not limiting. In further embodiments, buffer 416 may have any other format and/or structure suitable for a particular implementation.

As shown in FIG. 6, buffer 416 may temporarily store media content stream data 602. Media content stream data 602 may include a first portion 604 and a second portion 606. In some examples, first portion 604 may represent data that has already been played back to a user and second portion 606 may represent data not yet played back to the user. Implementation 600 also shows a first position line 608 representing the beginning of media content stream data 602 within buffer 416, a second position line or playback position line 610 representing a position of the playback of media content stream data 602, and a third position line or buffer position line 612 representing the buffer position or front end of media content stream data 602 within buffer 416. In some examples, playback position line 610 may also represent a boundary between first portion 604 and second portion 606 of media content stream data 602.

Playback position line 610 and buffer position line 612 may advance in a clockwise direction around buffer 416. For example, playback position line 610 may advance around buffer 416 as media content stream data 602 is played back to a user. Buffer position line 612 may advance in a clockwise direction around buffer 416 as media content stream data 602 is stored within the buffer. In some examples, playback position line 610 may advance around buffer 416 at a rate different than the rate of advancement of buffer position line 612.

The temporary storage of media content stream data 602 within buffer 416 may allow a user to perform one or more trick plays in the playback of media content stream data 602. For example, a user may rewind, pause, slow, and/or fast forward the playback of media content stream data 602.

Returning to FIG. 5, in step 506, an input command provided by the user to pause the playback of the media content stream is detected. The input command may be provided and/or detected in any suitable manner as may serve a particular implementation. For example, a user may provide the input command using user input device 406, as described in more detail above, and playback facility 306 may be configured to detect the input command.

In step 508, the playback of the media content stream is paused in response to the input command. The playback of the media content stream may be paused in any suitable manner. For example, playback facility 306 may be configured to pause the playback of the media content stream in response to the input command provided by the user.

In step 510, data representative of a portion of the media content stream not yet played back is accumulated within the buffer. The data representative of the portion of the media content stream not yet played back may be accumulated with the buffer in any suitable manner. For example, buffering facility 304 may be configured to accumulate the data representative of the portion of the media content stream not yet played back within the buffer.

Figure 7:
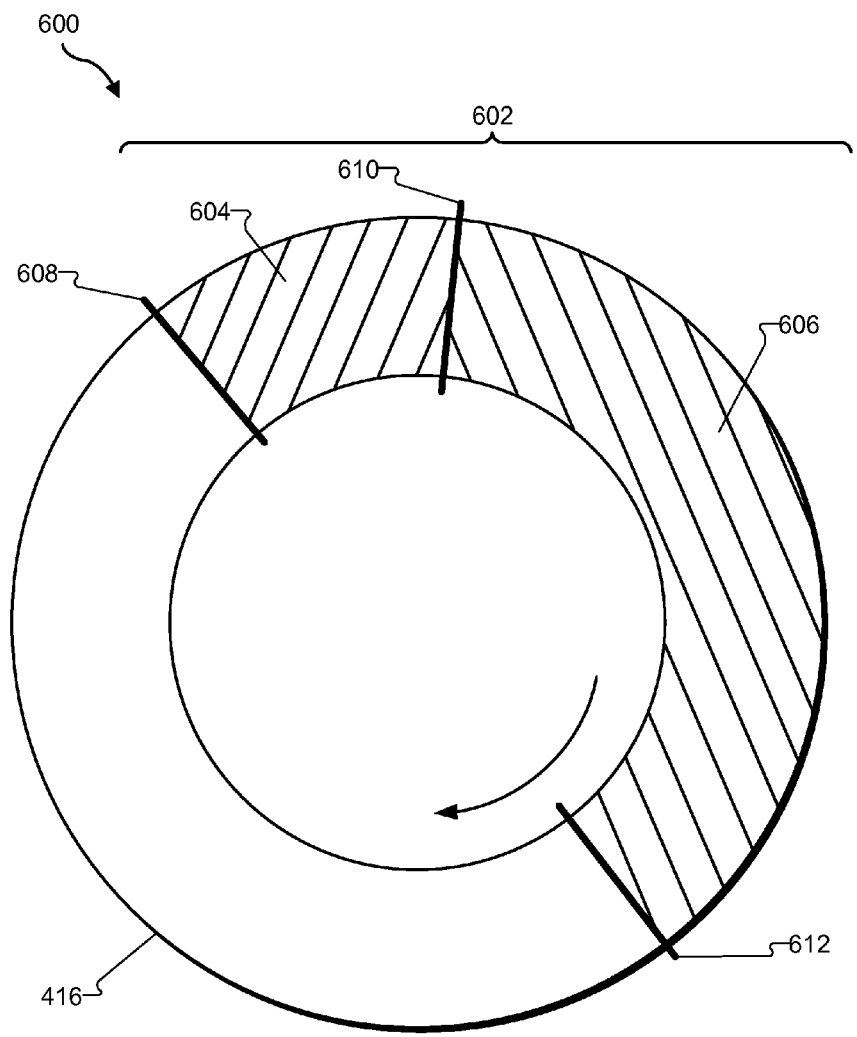
FIG. 7 illustrates the exemplary buffer of FIG. 6 wherein the playback of the media content stream is paused and the media content stream data not yet played back is being accumulated within the buffer according to principles described herein.

To illustrate, FIG. 7 shows buffer 416 with playback position line 610 in a stationary position, representing the pausing of the playback of media content stream data 602, and with buffering position line 612 continuing to advance around buffer 416, representing the continued buffering of media content stream data 602. As a result, second portion 606 (i.e., the portion of media content stream data 602 not yet played back) continues to accumulate within buffer 416. In some examples, the accumulation of second portion 606 may continue until it overwrites some or all of first portion 604. For example, second portion 606 may continue to accumulate until it fills buffer 416.

Returning to FIG. 5, in step 512, an alert condition is detected indicating that the data representative of the portion of the media content stream not yet played back is about to be lost from the buffer. The alert condition may be detected in any suitable manner and may indicate that the data representative of the portion of the media content stream not yet played back is about to be lost for any reason. For example, alert condition facility 308 may be configured to detect the alert condition, which may be configured to indicate that the data representative of the portion of the media content stream not yet played back is about to be overwritten within the buffer.

Figure 8:
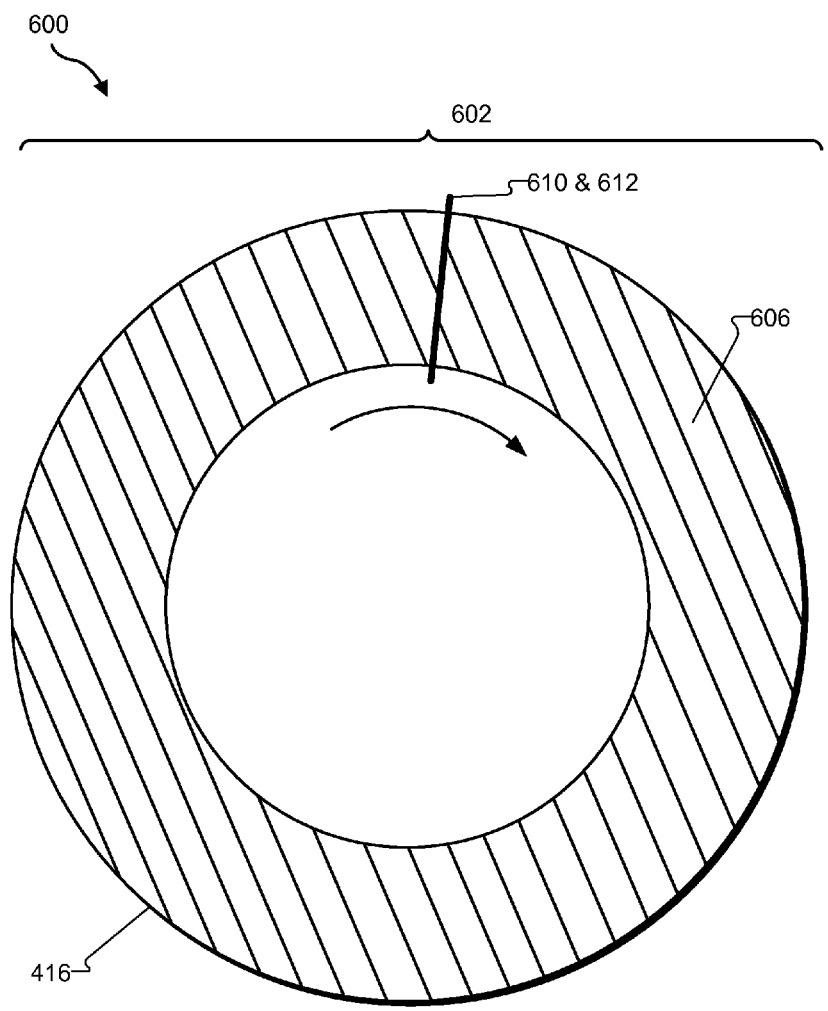
FIG. 8 illustrates the exemplary buffer of FIG. 6 wherein a portion of the media content stream data not yet played back is about to be lost according to principles described herein.

To illustrate, FIG. 8 shows buffer 416 with buffering position line 612 having reached the end of the available space within buffer 416 and with second portion 606 having filled buffer 416. As shown, buffering position line 612 has overtaken playback position line 610. As a result, at least a portion of second portion 606 is about to be overwritten by the continued advancement of buffering position line 612 (e.g., the continued buffering of media content stream data 602). In some examples, alert condition facility 308 may be configured to detect that at least a portion of second portion 606 is about to be overwritten.

The alert condition may be defined as may suit a particular implementation. In additional or alternative examples, for instance, the alert condition may be defined for detection at any suitable time after a playback of the media content stream is paused, at any suitable capacity of and/or threshold within the buffer (e.g., a predefined percentage of buffer capacity), or upon any other suitable event that occurs within or outside of the buffer. In some embodiments, the alert condition may be user configurable. For example, a user may set the alert condition to be detected at any suitable time after a playback of the media content stream is paused, at any suitable capacity of and/or threshold within the buffer, or upon any other suitable event that occurs within or outside of the buffer.

Returning to FIG. 5, in step 514, the data representative of the portion of the media content stream not yet played back is converted to a permanent recording. The data representative of the portion of the media content stream not yet played back may be converted to the permanent recording in any suitable manner as may serve a particular implementation. For example, data conversion facility 310 may be configured to convert second portion 606 of media content stream data 602 to a permanent recording to preserve the data for a user to experience at their convenience at a later time. In some examples, data conversion facility 310 may be configured to automatically convert the data to a permanent recording in response to a detection of the alert condition. Accordingly, a loss of buffered media content data that has not yet been played back may be avoided when playback is paused for a duration that extends beyond the capacity of buffer 416.

The portion of the media content stream converted to a permanent recording may have any size. For example, the portion of the media content stream not yet played back may be as small as a single frame or as large the capacity of the buffer. In some examples, the conversion of the data representative of the portion of the media content stream not yet played back to a permanent recording may occur incrementally (e.g., frame by frame) rather than all at once.

In some examples, converting the data representative of the portion of the media content stream not yet played back to a permanent recording may include converting the data to a plurality of permanent recordings. For example, the data representative of the media content stream not yet played back may include at least portions of two separate media content instances (e.g., two consecutive television programs), and data conversion facility 310 may be configured to convert the data representative of the first media content instance to a first permanent recording and the data representative of the second media content instance to a second permanent recording. Both of the permanent recordings may then be made available to the user for playback.

To illustrate, a user of access subsystem 104 may pause the playback of a first media content instance (e.g., a first television program) and then leave access subsystem 104 unattended for an extended length of time (e.g., one or more hours), during which time data representative of the first media content instance may be accumulated and temporarily stored within a buffer. During the user's absence, the first media content instance may end and be followed by a second media content instance (e.g., a second television program), which may also be at least partially stored within the buffer.

Access subsystem 104 may be configured to detect that the buffer includes data representative of multiple media content instances (e.g., the two media content instances described above). The detection may be made in any suitable manner. In some examples, data conversion facility 310 may be configured to examine the data stored within the buffer and detect an ending of the first media content instance and/or a beginning of the second media content instance. For example, data conversion facility 310 may be configured to examine the data stored within the buffer and detect a change in the data (e.g., a change of a media program identifier, a title, etc.) representing a transition between the first media content instance and the second media content instance. Additionally or alternatively, data conversion facility 310 may be configured to compare the particular time of day that the media content stream data was received with a program schedule (e.g., a program schedule received from delivery subsystem 102 or a third-party) to determine whether data representative of more than one television program was received during the particular time.

In response to a detection that two media content instances are stored in the buffer and upon detection of the alert condition, data conversion facility 310 may be configured to convert the data representative of the first media content instance to a first permanent recording and data representative of the second media content instance to a second permanent recording in any suitable manner. For example, multiple recordings may be generated by data conversion facility 310 from the buffered data. Additionally or alternatively, data conversion facility 310 may be configured to split a single permanent recording representing all of the data from the buffer into multiple recordings, each representing one of the media content instances.

Accordingly, access subsystem 104 may be configured to detect the presence of multiple media content instances stored within the buffer and generate multiple corresponding permanent recordings to make available for playback to a user.

Figure 9:
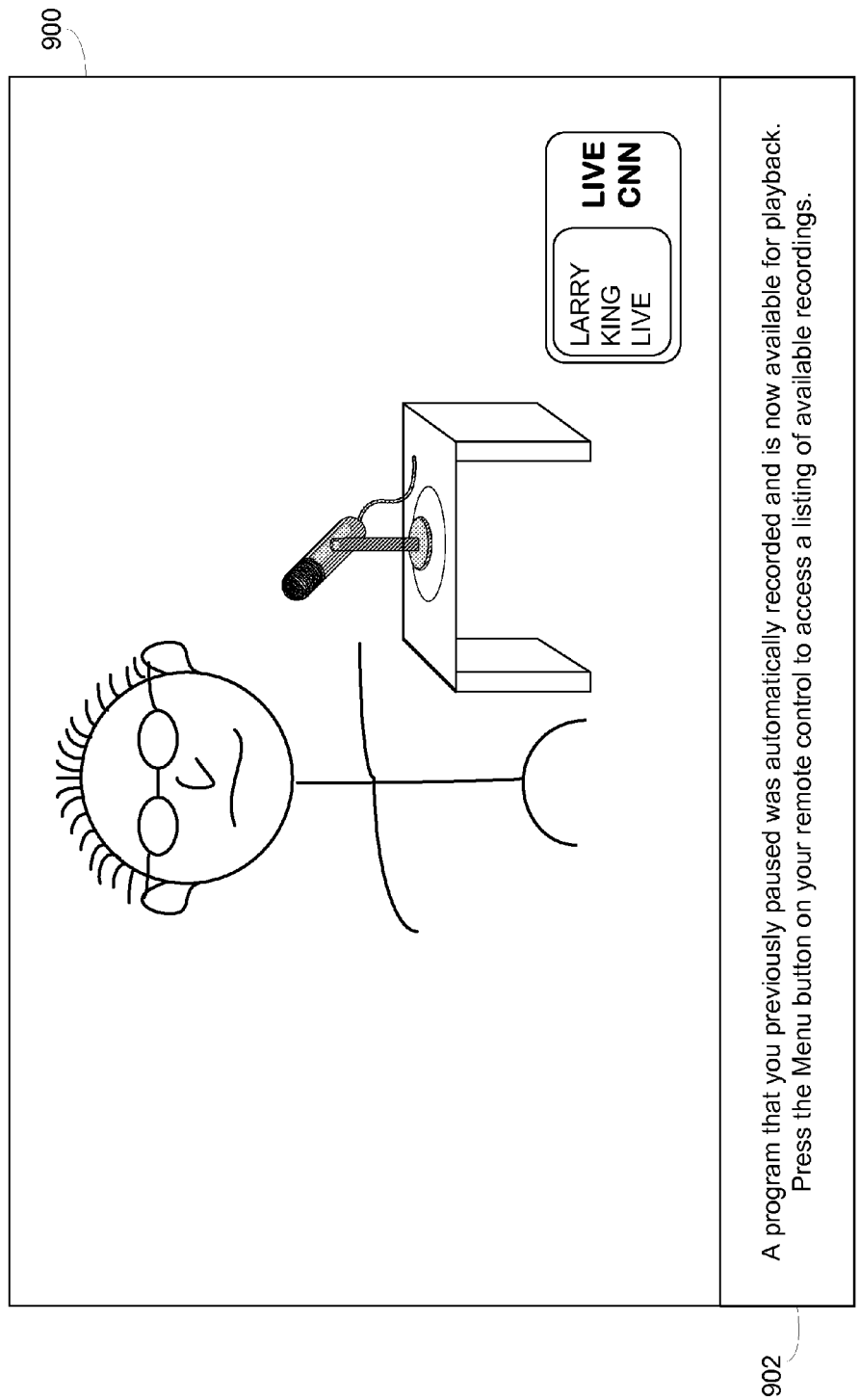
FIG. 9 illustrates an exemplary notification that media content stream data has been automatically converted to a permanent recording according to principles described herein.

Access subsystem 104 may be configured to provide a notification to a user that the portion of the media content stream not yet played back has been converted to the permanent recording and that the permanent recording is available for playback. For example, FIG. 9 illustrates an exemplary display 900 of a media content instance. Within display 900, access subsystem 104 may provide a notification 902 to the user that the portion of the media content stream not yet played back was converted to a permanent recording that is now available for playback. For example, notification 902 may inform the user that "A program that you previously paused was automatically recorded and is now available for playback." In some examples, notification 902 may further direct the user to "Press the menu button on your remote control to access a listing of available recordings."

Notification 902 may be provided to the user at any suitable time after the creation of the permanent recording. For example, notification 902 may be displayed when access subsystem 104 first detects interaction with the user (e.g., detects one or more input commands provided by the user) after the permanent recording is created.

In some examples, notification 902 may prompt a user for an input to indicate whether to retain a permanent recording. For example, notification 902 may prompt the user for an input command (e.g., which may be provided via a user input device) to indicate whether to retain the recording. If multiple permanent recordings were created, notification 902 may prompt the user for an input command to indicate whether to retain one, some, all, or none of the multiple permanent recordings. Access subsystem 104 may be configured to retain or delete the recordings in response to the input command received from the user.

Notification 902 is provided for illustrative purposes only and is not limiting. In additional or alternative embodiments, notification 902 may be provided in any other suitable manner and may include any additional or alternative information as may serve a particular implementation.

In some examples, data representative of a portion of the media content stream that has been played back may also be converted to a permanent recording. In this manner, a user may play back an entire television program that was paused part way through a live transmission thereof. For example, alert condition facility 308 may be configured to detect an alert condition indicating that data representative of an entire television program or a beginning of an entire television program is about to be lost from a buffer. In response to the detection, data conversion facility 310 may be configured to convert the data representative of the entire television program from the buffer to a permanent recording. The permanent recording of the entire television program may then be made available for playback to a user.

Figure 10:
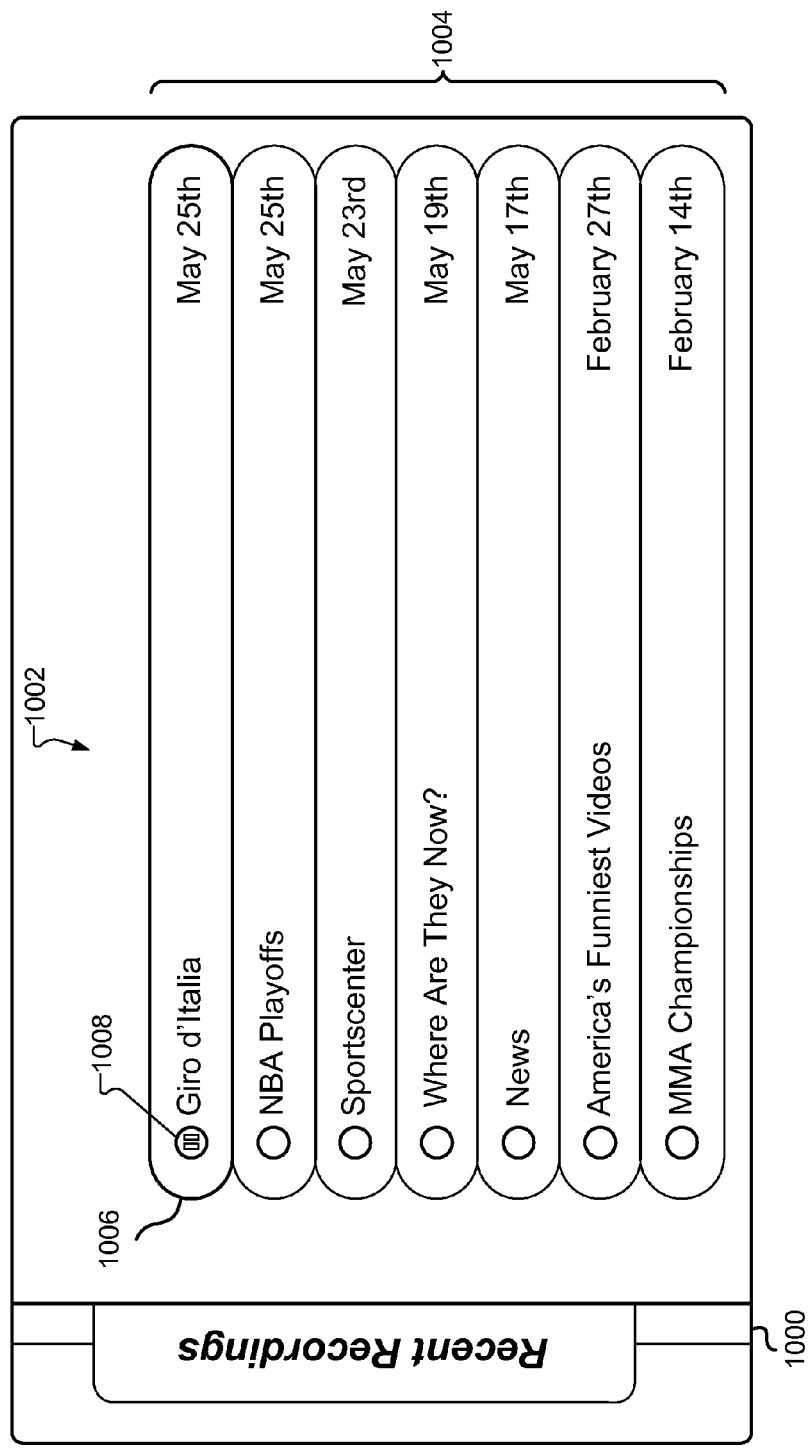
FIG. 10 illustrates an exemplary graphical user interface ("GUI") including a listing of available permanent recordings according to principles described herein.

In some examples, access subsystem 104 may be configured to provide a graphical user interface ("GUI") including a listing of available permanent recordings. For example, FIG. 10 represents an exemplary GUI 1000 including a listing 1002 of permanent recordings 1004 available for playback to the user. Listing 1002 may include any number of permanent recordings available to the user. The user may utilize a user input device (e.g., a remote control device) to select a recording from listing 1002 for playback or other operation. In some examples, listing 1002 may include at least one converted permanent recording 1006 (i.e., a permanent recording created by the conversion of data representative of a media content stream not yet played back from a buffer to the permanent recording). Converted permanent recording 1006 may be listed along with other permanent recordings 1004 (e.g., permanent recordings 1004 created at the direction of the user).

In some examples, the display of converted permanent recording 1006 within GUI 1000 may be distinguished from the display of other permanent recordings 1004. For example, converted permanent recording 1006 may be distinguished with a graphical indicator 1008 that is distinct from other graphical indicators associated with the other permanent recordings 1004. In additional or alternative examples, converted permanent recording 1006 may be distinguished from the other permanent recordings 1004 in any other suitable manner.

GUI 1000 is provided for exemplary purposes only and is not limiting. Access subsystem 104 may be configured to display additional information or exclude certain information as may serve a particular implementation. Additionally or alternatively, access subsystem 104 may be configured to provide a user with access to converted permanent recording 1006 in any other suitable manner.

In some examples, access subsystem 104 may be configured to detect that the data representative of the portion of the media content stream not yet played back is missing at least a part of a media content instance that has not been played back (e.g., the media content stream data may contain a portion of a television program but may be missing an ending of the television program). In response to a detection that the portion of the media content stream is missing data representative of at least a part of the portion of the media content instance not yet played back, access subsystem 104 may be configured to request, receive, and/or add the missing part of the media content instance to the permanent recording to preserve the missing part for a user to experience.

To illustrate, a user of access subsystem 104 may pause the playback of a particular media content instance (e.g. a movie) and then leave access subsystem 104 unattended for an extended period of time (e.g., several hours), during which time data representative of the media content instance may be accumulated and temporarily stored within a buffer associated with access subsystem 104. However, the buffer may be incapable of storing the entire portion of the media content instance not yet played back due to the length of the portion of the media content instance not yet played back. As a result, once the alert condition is detected and the data within the buffer is converted to a permanent recording, at least a part of the media content instance (e.g., the ending of the movie) may be missing from the permanent recording.

Access subsystem 104 may be configured to detect that the converted recording is missing at least part of the media content instance in any suitable manner as may serve a particular implementation. For example, data conversion facility 310 may be configured to examine the media content stream data and determine that there has been no transition from the particular media content instance to another media content instance (e.g., there has been no change in a media program identifier or a title within the media content stream data). Additionally or alternatively, data conversion facility may be configured to examine a program schedule associated with the media content instance to determine when the media content instance is scheduled to end and compare the schedule with a clock reference to determine whether the media content instance will end after the data within the buffer is converted to a permanent recording.

In response to a detection that the permanent recording does not or will not include at least part of the portion of the media content instance not yet played back, access subsystem 104 may capture the remaining part of the media content instance and preserve it for playback to a user. For example, in response to the detection, access subsystem 104 may be configured to initiate a normal recording of the remaining part of the media content instance, starting at the end of the converted permanent recording. This normal recording could be added to the converted permanent recording as it is recorded or after it is recorded. In additional or alternative examples, access subsystem 104 may be configured to continue to accumulate and temporarily store the data representative of the media content instance in the buffer while concurrently converting the data stored within the buffer to the permanent recording in order to free up buffer space.

In some examples, the conversion of the data stored within the buffer to the permanent recording may occur on an iterative basis, section-by-section (e.g., frame-by-frame), thereby iteratively freeing up buffer space for the continued buffering of the media content instance. The iterative conversion of the media content instance may continue until an ending of the media content instance is detected in any suitable manner, such as described herein. The converted iterative sections of the media content instance may then be combined together to form one permanent recording representing the entire portion of the media content instance not yet played back (e.g., from the point playback was paused to the end of the media content instance). Access subsystem 104 may be configured to preserve the entire portion of the media content instance not yet played back for playback to the user in any other suitable manner.

In certain examples, access subsystem 104 may be configured to detect that data representative of the portion of the media content stream not yet played back includes the entire portion of a media content instance not yet played back and, in response to the detection, discontinue accumulating the data representative of the portion of the media content stream not yet played back in the buffer. For example, access subsystem 104 may be configured to detect a transition from a media content instance to an additional media content instance as the data representative of the media content stream is being stored within the buffer, thereby indicating that the entire portion of the media content instance not yet played back (e.g., from the time playback of the media content instance was paused to the end of the media content instance) is stored within the buffer and can be converted to a permanent recording.

Access subsystem 104 may be configured to detect the ending of the media content instance in any suitable manner, such as by detecting the ending of the media content instance based on a programming schedule and/or based on data (e.g., media program identifiers, titles, etc.) included in the media content stream. In response to the detection that the portion of the media content instance not yet played back is entirely stored within the buffer, access subsystem 104 may be configured to discontinue accumulating the data representative of the portion of the media content stream within the buffer and convert the data representative of the stored portion of the media content instance to a permanent recording for the user to playback at a later time. In certain examples, access subsystem 104 may be configured to detect data representing an ending of a media content instance within buffer 416 and discontinue accumulation of data representative of the portion of the media content stream not yet played back in buffer 416 based on an end-user-configured setting.

By discontinuing the accumulation of the data representative of the media content stream in response to the detection that the entire portion of the media content instance not yet played is stored in the buffer, access subsystem 104 may be configured to ensure that the media content instance being viewed by the user at the time the playback of the media content stream was paused is fully captured, but that no additional programming is included within the resulting permanent recording.

Figure 11:
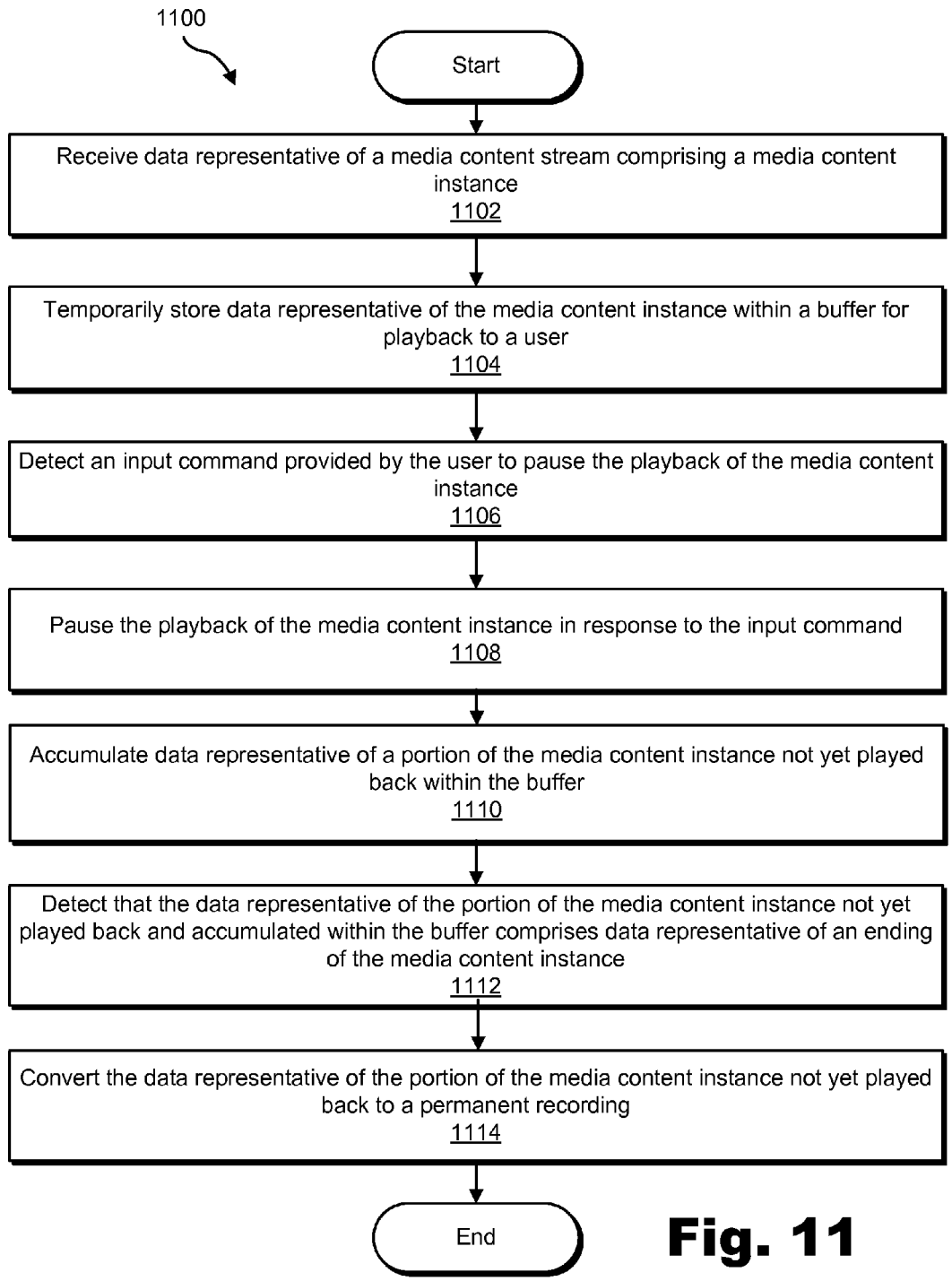
FIG. 11 illustrates another exemplary method of automatically converting media content stream data within a buffer to a permanent recording according to principles described herein.

FIG. 11 illustrates another exemplary method 1100 of automatically converting media content stream data from a buffer to a permanent recording. While FIG. 11 illustrates exemplary steps according to one embodiment, other embodiments may omit, add to, reorder, and/or modify any of the steps shown in FIG. 11. The steps shown in FIG. 11 may be performed by any component or combination of components of access subsystem 104.

In step 1102, data representative of a media content stream comprising a media content instance is received. The data representative of the media content stream may be received in any suitable manner, such as described herein.

In step 1104, data representative of the media content instance is temporarily stored within a buffer for playback to a user. The data representative of the media content instance may be temporarily stored within the buffer in any suitable manner, such as described herein.

In step 1106, an input command provided by the user to pause the playback of the media content instance is detected. The input command may be detected in any suitable manner, such as described herein.

In step 1108, the playback of the media content instance is paused in response to the input command. The playback of the media content instance may be paused in any suitable manner, such as described herein.

In step 1110, data representative of a portion of the media content instance not yet played back is accumulated within the buffer. The data representative of the portion of the media content instance not yet played back may be accumulated within the buffer in any suitable manner, such as described herein.

In step 1112, it is detected that the data representative of the portion of the media content instance not yet played back and accumulated within the buffer comprises data representative of an ending of the media content instance. That the data representative of the portion of the media content instance not yet played back accumulated within the buffer comprises data representative of an ending of the media content instance may be detected in any suitable manner, such as described herein.

In step 1114, the data representative of the portion of the media content instance not yet played back is converted to a permanent recording. The data representative of the portion of the media content instance not yet played back may be converted to a permanent recording in any suitable manner, such as described herein.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied in a non-transitory computer-readable medium, or combinations of computer-implemented instructions and hardware, configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 12:
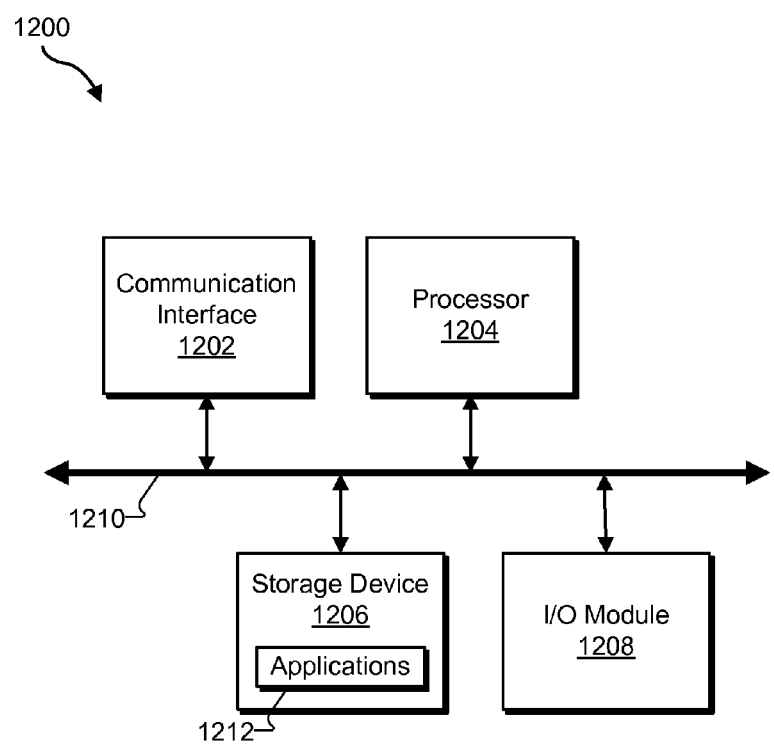
FIG. 12 illustrates an exemplary computing device according to principles described herein.

FIG. 12 illustrates an exemplary computing device 1200 that may be configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, and any other suitable interface. In at least one embodiment, communication interface 1202 may provide a direct connection between system 100 and one or more of provisioning systems via a direct link to a network, such as the Internet. Communication interface 1202 may additionally or alternatively provide such a connection through, for example, a local area network (such as an Ethernet network), a personal area network, a telephone or cable network, a satellite data connection, a dedicated URL, or any other suitable connection. Communication interface 1202 may be configured to interface with any suitable communication media, protocols, and formats, including any of those mentioned above.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1206. For example, data representative of one or more executable applications 1212 (which may include, but are not limited to, one or more of the software applications described herein) configured to direct processor 1204 to perform any of the operations described herein may be stored within storage device 1206. In some examples, data may be arranged in one or more databases residing within storage device 1206.

I/O module 1208 may be configured to receive user input and provide user output and may include any hardware, firmware, software, or combination thereof supportive of input and output capabilities. For example, I/O module 1208 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1208 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated with media content facility 202, communication facility 204, communication facility 302, buffering facility 304, playback facility 306, alert condition facility 308, and/or data conversion facility 310. Likewise, storage facility 206 and/or storage facility 312 may be implemented by or within storage device 1206.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    receiving, by a media content access subsystem, data representative of a media content stream;
    temporarily storing, by the media content access subsystem, the data representative of the media content stream within a buffer for playback to a user;
    detecting, by the media content access subsystem, an input command provided by the user to pause the playback of the media content stream;
    pausing, by the media content access subsystem, the playback of the media content stream in response to the input command;
    accumulating, by the media content access subsystem, data representative of a portion of the media content stream not yet played back within the buffer;
    detecting, by the media content access subsystem, an alert condition indicating that the data representative of the portion of the media content stream not yet played back is about to be lost such that the user would be unable to experience the portion of the media content stream at a future point in time; and
    converting, by the media content access subsystem in response to detecting the alert condition, the data representative of the portion of the media content stream not yet played back to a permanent recording to preserve the portion of the media content stream for the user to experience at the future point in time.

2. The method of claim 1, further comprising providing, by the media content access subsystem, a notification to the user that the portion of the media content stream not yet played back was converted to the permanent recording and that the permanent recording is available for playback.

3. The method of claim 2, further comprising prompting, by the media content access subsystem, the user for an input to indicate whether to retain the permanent recording.

4. The method of claim 1, wherein the detecting the alert condition comprises detecting that at least part of the data representative of the portion of the media content stream not yet played back is about to be overwritten.

5. The method of claim 1, wherein the media content stream comprises a media content instance and wherein the method further comprises:
    detecting, by the media content access subsystem, that the data representative of the portion of the media content stream not yet played back comprises an ending of the media content instance; and
    discontinuing, by the media content access subsystem in response to the detection that the data representative of the portion of the media content stream not yet played back comprises an ending of the media content instance, the accumulating of the data representative of the portion of the media content stream in the buffer.

6. The method of claim 1, wherein the portion of the media content stream not yet played back comprises a portion of a first media content instance and a portion of a second media content instance.

7. The method of claim 6, wherein the converting of the data representative of the portion of the media content stream not yet played back to the permanent recording comprises converting the data representative of the portion of the first media content instance to a first permanent recording and converting the data representative of the portion of the second media content instance to a second permanent recording.

8. The method of claim 7, further comprising:
providing, by the media content access subsystem, a notification to the user indicating that the first permanent recording and the second permanent recording are available for playback; and
prompting, by the media content access subsystem, the user for an input command to indicate whether to retain one or both of the first permanent recording and the second permanent recording.

9. The method of claim 1, wherein the alert condition is user configurable and wherein the method further comprises receiving, by the media content access subsystem, an input command from the user to configure the alert condition.

10. The method of claim 1, embodied as computer-executable instructions on at least one non-transitory computer-readable medium.

11. A method comprising:
receiving, by a media content access subsystem, data representative of a media content stream;
temporarily storing, by the media content access subsystem, data representative of the media content stream within a buffer for playback to a user;
detecting, by the media content access subsystem, an input command provided by the user to pause the playback of the media content stream;
pausing, by the media content access subsystem, the playback of the media content stream in response to the input command;
accumulating, by the media content access subsystem, data representative of the media content stream not yet played back within the buffer;
examining, by the media content access subsystem, the data representative of the media content stream not yet played back and accumulated within the buffer;
detecting, by the media content access subsystem while examining the data representative of the media content stream not yet played back and accumulated within the buffer, that the data representative of the media content stream not yet played back and accumulated within the buffer comprises data representative of at least one of an ending of a first media content instance and a beginning of a second media content instance; and
converting, by the media content access subsystem in response to detecting that the data representative of the media content stream not yet played back and accumulated within the buffer comprises the data representative of the at least one of the ending of the first media content instance and the beginning of the second media content instance, data representative of the first media content instance not yet played back and accumulated within the buffer to a permanent recording.

12. The method of claim 11, further comprising discontinuing, by the media content access subsystem in response to the detection that the data representative of the portion of the media content instance not yet played back and accumulated within the buffer comprises the data representative of the at least one of the ending of the first media content instance and the beginning of the second media content instance, to accumulate data representative of the first media content instance not yet played back within the buffer.

13. The method of claim 11, wherein:
the accumulating of the media content stream not yet played back within the buffer comprises accumulating data representative of the second media content instance within the buffer; and
further comprising converting, by the media content access subsystem, the data representative of the second media content instance to a second permanent recording.

14. The method of claim 11, further comprising providing, by the media content access subsystem, a notification to the user that the data representative of the first media content instance was converted to the permanent recording and that the permanent recording is available for playback.

15. A system comprising:
a communication facility configured to receive data representative of a media content stream;
a buffering facility communicatively coupled to the communication facility and configured to temporarily store the data representative of the media content stream within a buffer for playback to a user;
a playback facility communicatively coupled to the buffering facility and configured to detect an input command provided by the user to pause the playback of the media content stream and configured to pause the playback of the media content stream in response to the input command, and wherein the buffering facility is further configured to accumulate data representative of a portion of the media content stream not yet played back within the buffer while the playback of the media content stream is paused;
an alert condition facility communicatively coupled to the playback facility and configured to detect an alert condition indicating that the data representative of the portion of the media content stream not yet played back is about to be lost such that the user would be unable to experience the portion of the media content stream at a future point in time; and
a data conversion facility communicatively coupled to the alert condition facility and configured to convert the data representative of the portion of the media content stream not yet played back to a permanent recording to preserve the portion of the media content stream for the user to experience at the future point in time in response to the detection of the alert condition.

16. The method of claim 1, further comprising:
detecting, by the media content access subsystem, that the data representative of the portion of the media content stream converted to the permanent recording does not include data representative of another portion of the media content instance;
requesting and receiving, by the media content access subsystem, the data representative of the another portion of the media content instance in response to the detection that the data representative of the portion of the media content instance converted to the permanent recording does not include the data representative of the another portion of the media content instance; and
adding, by the media content access subsystem, the data representative of the another portion of the media content instance to the permanent recording.

17. The method of claim 1, further comprising providing, by the media content access subsystem, a listing of permanent recordings for presentation to the user in a graphical user interface, wherein the listing of permanent recordings includes the permanent recording converted from the data representative of the portion of the media content stream, and one or more other permanent recordings.

18. The method of claim 17, further comprising displaying, by the media content access subsystem, a graphical indicator that distinguishes the converted permanent recording from the one or more other permanent recordings included in the listing of permanent recordings provided for presentation to the user in the graphical user interface.

19. The method of claim 1, wherein the detecting of the alert condition comprises detecting an alert condition indicating that the data representative of the portion of the media content stream not yet played back is about to be lost from the media content access subsystem such that the user would be unable to experience the portion of the media content stream at a future point in time at a future point in time; and wherein the converting of the data representative of the portion of the media content stream comprises converting the data representative of the portion of the media content stream not yet played back to a permanent recording to preserve the portion of the media content stream within the media content access subsystem for the user to experience at the future point in time.

20. The method of claim 1, wherein the detecting of the alert condition comprises detecting that the data representative of the portion of the media content stream not yet played back has reached the end of the buffer.

* * * * *